United States Patent

Burns et al.

[11] Patent Number: 6,109,817
[45] Date of Patent: Aug. 29, 2000

[54] DRIVESHAFT COUPLER

[75] Inventors: Bradley A. Burns, Wapakoneta; John B. Bornhorst, New Bremen, both of Ohio

[73] Assignee: The Minster Machine Company, Minster, Ohio

[21] Appl. No.: 09/139,501

[22] Filed: Aug. 25, 1998

[51] Int. Cl.[7] ................................................ F16D 1/06
[52] U.S. Cl. ................ 403/305; 403/370; 403/374.3; 403/313; 403/371; 403/312
[58] Field of Search ................ 403/370, 373, 403/374.1, 374.2, 374.3, 374.4, 371, 368, 305, 309, 313, 310, 312; 285/382, 417

[56] References Cited

U.S. PATENT DOCUMENTS

| | | |
|---|---|---|
| 355,062 | 12/1886 | Cook . |
| 364,537 | 6/1887 | Miller . |
| 676,675 | 6/1901 | Davis . |
| 1,393,064 | 10/1921 | Woodward . |
| 3,434,303 | 3/1969 | Leyer . |
| 3,972,635 | 8/1976 | Peter et al. ............... 403/370 |
| 3,998,563 | 12/1976 | Kloren ................ 403/370 |
| 4,134,699 | 1/1979 | Schäfer et al. . |
| 4,268,185 | 5/1981 | Müllenberg . |
| 4,396,310 | 8/1983 | Mullenberg ............ 403/370 X |
| 4,781,486 | 11/1988 | Mochizuki . |
| 4,981,389 | 1/1991 | Keon . |
| 5,058,931 | 10/1991 | Bowsher ............ 285/382 X |
| 5,421,623 | 6/1995 | Cassin ................ 285/417 X |

FOREIGN PATENT DOCUMENTS 2142453  8/1973  Germany ................ 403/370

Primary Examiner—Terry Lee Melius
Assistant Examiner—John R. Cottingham
Attorney, Agent, or Firm—Randall J. Knuth

[57] ABSTRACT

A coupling device joins and axially aligns segments of a driveshaft or other shaft to form one, continuous length, shaft for use in a machine press.

6 Claims, 4 Drawing Sheets

DRIVESHAFT COUPLER

BACKGROUND OF THE INVENTION

1. Field of the Invention

The present invention relates to a driveshaft coupler, and in particular, a driveshaft coupler which joins two sections of a driveshaft to create one, united driveshaft unit for use in a machine press.

2. Description of the Related Art

A typical driveshaft used in a machine press is designed as a single, continuous shaft. Therefore, assembly of the driveshaft in a machine press requires handling and positioning of the shaft.

One problem with using a single, continuous driveshaft in a machine press is the difficulty in handling the entire shaft. Assembly and disassembly of the driveshaft from a machine press requires the entire driveshaft to be maneuvered into and out of position. Handling an entire driveshaft can be difficult and awkward.

A second problem with using a continuous driveshaft in a machine press is the need to remove the entire shaft if brake or clutch service is required.

A third problem with using a continuous shaft in a machine press is the requirement of removing the entire driveshaft if a drive belt to the motor or flywheel require replacement.

A fourth problem with using a continuous shaft in a machine press is the difficulty of machining a single piece driveshaft.

SUMMARY OF THE INVENTION

According to the present invention, a driveshaft coupler joins two sections of a driveshaft to form a single, united driveshaft unit for use in a machine press. Multiple segments of driveshaft can be coupled together to form a single driveshaft length. These segments can be easily joined and separated for ease of installation into a machine press and servicing a machine press without sacrificing the rigidity of the drive system.

The invention, in one form thereof, is a coupling device for joining the ends of two sections of a shaft. The device includes an annular sleeve with an inner surface defining a bore. The bore receives the ends of two shaft segments. The two segments are axially aligned relative to one another. The coupling device is clamped to the shaft segments.

An advantage of the present invention is the ease of driveshaft installation. By providing a driveshaft split at one or more places along its length, the driveshaft can be assembled and installed into a machine press easier than a single, continuous shaft.

Another advantage of the present invention is the simplification of clutch and brake unit assembly. Having the driveshaft divided into segments allows maneuvering of individual segments of driveshaft rather than an entire driveshaft. Consequently, the installation of clutch and brake units onto a driveshaft segment is made simpler compared to installation onto the entire driveshaft.

A further advantage of the present invention is the simplification of maintenance of a machine press. Service of a clutch or brake requires removing only the shaft section containing the clutch or brake. Pinion gears can remain engaged with the gears, as well as the associated gear guarding.

In addition, changing of a belt between the drive motor and flywheel is streamlined. This invention does not require the entire driveshaft to be removed if a belt needs to be replace. Consequently, there is a cost savings due to the simplification of assembly and maintenance. Additionally, press machine downtime is thereby reduced.

Another advantage of the present invention is machining of the driveshaft is less difficult. Machining shorter length shafts are easier than machine a long, continuous shaft.

A further advantage of the present invention is that setting and controlling backlash on the gears at each end of the shaft is made easier. The driveshaft coupling can be adjusted to ensure that the pinion at each end is driving equally, or if desired, the total backlash of the gear set can be adjusted by rotating one pinion relative to the other to limit the combined total backlash of the drive.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
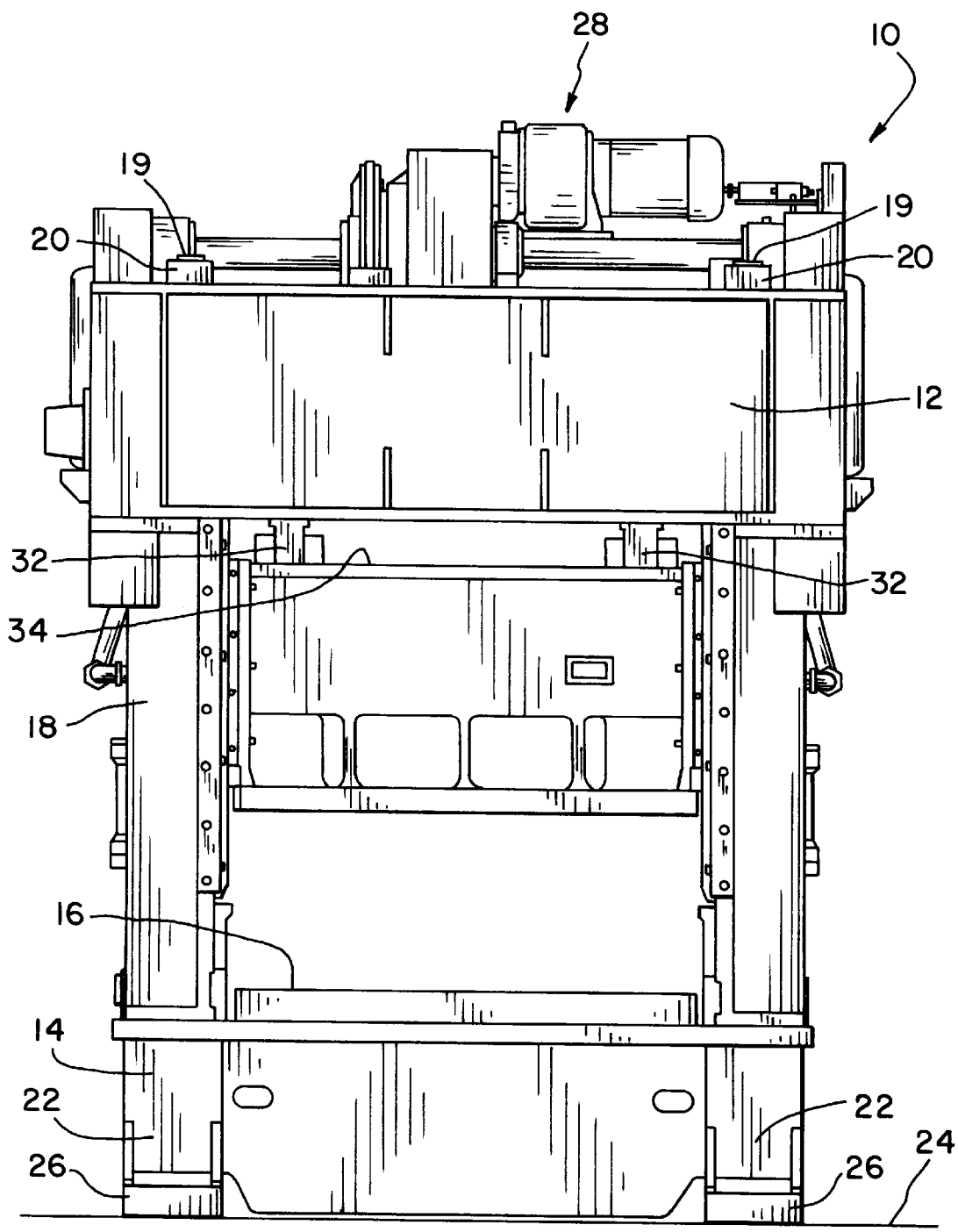
FIG. 1 is a front elevational view of a press machine incorporating the present invention.

Referring now to the drawings and particularly to FIG. 1, there is shown a front elevational view of a press machine incorporating the present invention. Mechanical press 10 comprises a crown assembly, such as crown 12, a bed assembly, such as bed 14, having a bolster assembly 16 connected thereto and uprights 18 connecting crown 12 with bed 14. Uprights 18 are connected to or integral with the underside of crown 12 and the upper side of bed 14. Tie rods 19 extend through crown 12, uprights 18, and bed portion 14, and are attached on each end with tie rod nuts 20. Leg members 22 are formed as an extension of bed 14 and are generally mounted on the shop floor 24 by means of shock absorbing pads 26.

A drive mechanism, such as a press drive motor 28, is attached to crown 12 of press 10 and connected by a clutch/brake mechanism 88 (FIG. 5) to a driveshaft 30 (FIG. 5), to which connecting rods 32 are connected via gearing and a crankshaft (not shown). A slide 34 is operatively connected to connecting rods 32. During operation, drive motor 28 rotates driveshaft 30 and the crankshaft which operates the eccentrically connected connecting rods 32 to cause slide 34 to reciprocate in rectilinear fashion toward and away from bed 14.

Figure 2:
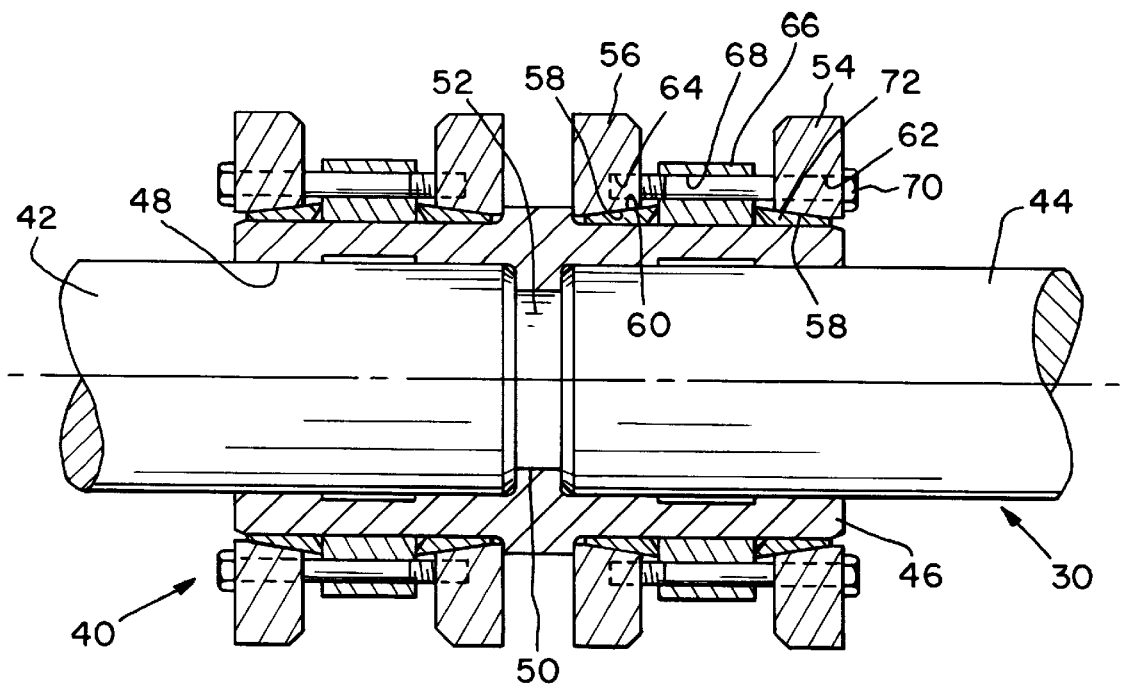
FIG. 2 is a sectional view of a driveshaft with a driveshaft coupler.
Figure 3:
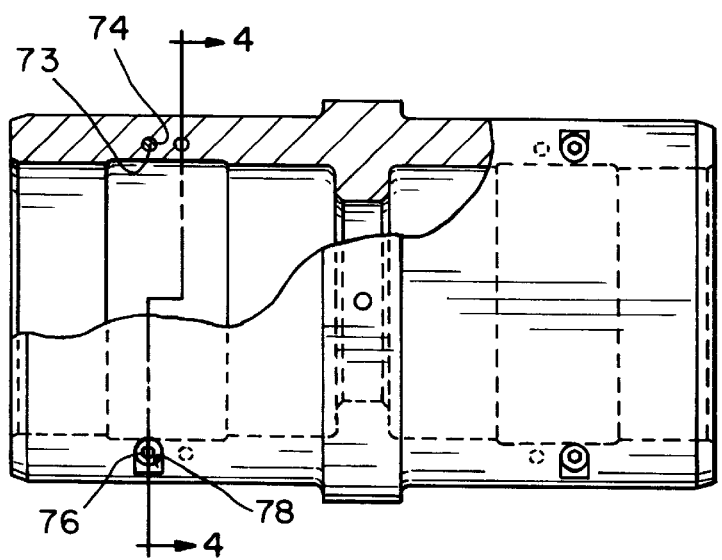
FIG. 3 is a partial cross-sectional view of a driveshaft with a driveshaft coupler.

Referring now to FIG. 2, there is shown a sectional diagram of one particular embodiment of this invention. The invention includes a coupling device 40 which joins two segments 42, 44 of driveshaft 30 to form a single length driveshaft. The inner surface of annular sleeve 46 defines a bore 48 in which shaft segments 42, 44 are inserted.

Alignment means axially aligns driveshaft segments 42, 44 relative to one another. In this embodiment, the alignment means consists of shoulder portion 50 within annular sleeve 46. Axial alignment of shaft segments 42, 44 occurs when shaft segments 42, 44 abut shoulder portion 50. Gap 52 is formed between joined shaft segments 42, 44. Gap 52 allows for the removal of flywheel drive belts, and/or shaft oil seals, etc. without removing the driveshaft from the press.

Coupling device 40 clamps to driveshaft segment 42, 44 by a pair of two shrink discs 54, 56. Shrink discs 54, 56 contain beveled annular surface 58. Beveled annular surface 58 sits on beveled annular ridge 60 of annular sleeve 46. Shrink disc 54 contains shrink disc aperture 62 and shrink disc 56 contains threaded chamber 64. Alternatively, rather than being integrated into shrink disc 56, threaded chamber 64 can be contained within a nut or similar fastening device (not shown). Spacer 66 is located between shrink discs 54, 56 and contains spacer aperture 68.

A bolt 70 is inserted through shrink disc aperture 62 and spacer aperture 66 and is threaded into threaded chamber 64. Tightening of bolt 70 reduces the space between shrink discs 54, 56. Tightening of bolt 70 reduces the space between shrink discs 54, 56. Tightening of bolt 70 also provides compressive forces around outside of annular sleeve 46, thereby clamping coupling device 40 to driveshaft 42, 44 so torque can be transmitted through the coupling 40. As shrink discs 54, 56 approach one another, beveled annular surface 58 of shrink disc 54, 56 compress ridge 72, which in turn, compress annular sleeve 46 into shaft segment 42, 44, thereby clamping annular sleeve 46 into shaft segment 42, 44. Ridge 72 can either be a separate component attached to annular sleeve 46 or ridge 72 can be integrated into the design of annular sleeve 46.

Figure 4:
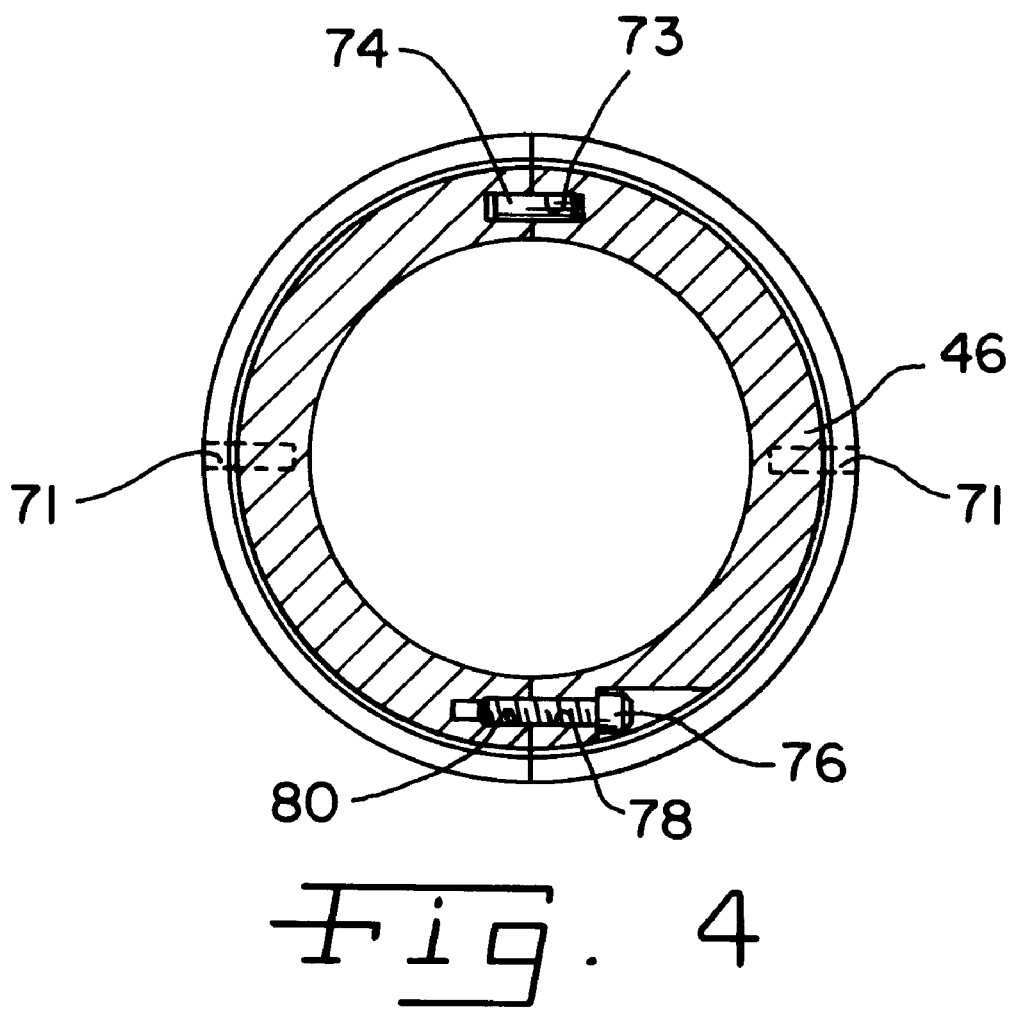
FIG. 4 is a cross-sectional view of a coupling device along line 4—4 of FIG. 3.

Annular sleeve 46 is composed of two halves, or formed monolithically (best shown in FIG. 4). This split design allows removal of the coupling without sliding the driveshafts axially, thereby providing easier assembly.

Handling holes 71 are located on opposite sides of annular sleeve 46. Dowel bore 73 is made into each half of annular sleeve. Dowel 74 is inserted to dowel bore 73. Threaded bolt 76 is inserted through aperture 78 of one half of annular sleeve 46 and threaded into threaded chamber 80 of the other half of annular sleeve 46.

The two halves of annular sleeve 46 are joined together around the ends of the driveshaft segments 42, 44. Tightening bolt 76, draws driveshaft segments 42, 44 in axially alignment relative to one another. In another embodiment, tightening bolt 76 creates a friction fit between annular sleeve 46 and driveshafts 42, 44 sufficient to transmit torque; thereby eliminating shrink discs 54, 56.

Coupling device 40 can be used to set torsional stiffness. The stiffness can be set less than, equal to, or greater than the driveshaft itself, depending on desired performance. Torsional stiffness can be controlled by the amount of interference fit between annular sleeve 46, and drive shaft segments 44, 42. Decreasing the interference fit decreases the coupling stiffness, allowing the coupling to act as a torque limiter. Torsional stiffness can also be varied by increasing the annular sleeve 46 cross-section to increase stiffness or decrease annular sleeve 46 cross-section to decrease stiffness.

Figure 5:
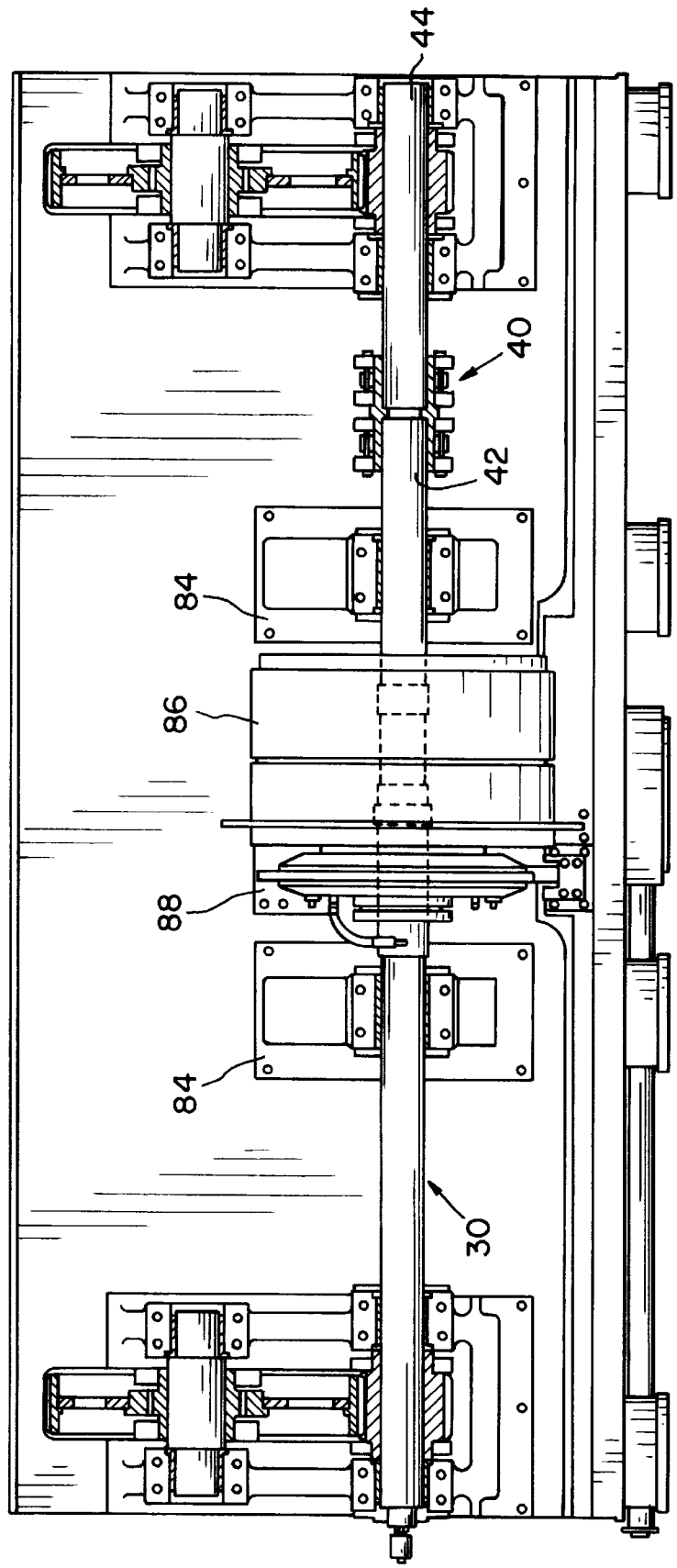
FIG. 5 is a sectional view of a machine press.

FIG. 5 shows a cross-sectional view of a machine press incorporating the present invention. Coupling device 40 joins shaft segments 42, 44. Shaft segment 44 runs from coupling device 40 through center bearing assembly 84, flywheel 86, and clutch and brake assembly 88.

Coupling device 40 may be applied to other longitudinal shafts such as crankshafts and the like. In addition, multiple coupling devices can be used to join numerous segments of a driveshaft to create one, united driveshaft.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coupling device for joining the ends of two shaft sections, comprising:

an annular sleeve, said annular sleeve containing two ends, said annular sleeve containing an inner surface defining a bore;

said bore receiving the ends of the two shaft segments;

aligning means for axially aligning the two segments of the shaft relative to each other, said aligning means including an integral shoulder portion formed of said annular sleeve and annularly protruding from said inner surface, said shoulder axially separating the ends of the joining shaft sections;

attachment means for clamping said annular sleeve to the shaft segments;

a pair of first and second shrink discs, said first and second shrink discs compressively securing said annular sleeve to the shaft;

said first and second shrink discs containing a beveled inner annular surface;

a pair of two ridges with beveled top, said two ridges annularly located on said end of said annular sleeve;

said first and second shrink discs inner annular surface positioned respectively on said two ridges;

said first shrink discs containing a shrink disc aperture;

said second shrink disc containing a threaded chamber;

a spacer element interposed between said first and second shrink disc, said spacer having a spacer aperture; and a threaded bolt, said bolt inserted through said first shrink disc aperture and said space aperture, and threaded into said second disc threaded chamber, whereby, tightening said bolt compresses said ridges inward, toward the shaft, thereby securing said sleeve to the shaft.

2. A coupling device according to claim 1, wherein said annular sleeve is formed monolithically.

3. A coupling device according to claim 2, further comprising:

a gap, said gap located between the ends of the joining shaft segments.

4. A coupling device for joining the ends of two shaft sections, comprising:

an annular sleeve said annular sleeve containing two ends, said annular sleeve containing an inner surface defining a bore, said annular sleeve formed monolithically;

said bore receiving the ends of the two shaft segments;

a shoulder portion annularly protruding from said inner surface;

a gap, said gap located between the ends of the joining shaft segments;

said shoulder located between the ends of the joining shaft segments;

said shoulder located between the ends of the joining shaft segments whereby defining said gap;

a pair of two ridges with beveled top, said two ridges annularly located on said end of said sleeve;

a pair of first and second shrink discs, said first and second shrink discs containing a beveled inner annular surface;

said first and second shrink discs inner annular surface positioned on said two ridges, respectively;

said first shrink disc containing a shrink disc aperture;

said second shrink disc containing a threaded chamber;

a spacer element interposed between said first and second shrink discs, said spacer having a spacer aperture; and a threaded bolt, said bolt inserted through said first shrink disc aperture and said spacer aperture, and threaded into said second disc threaded chamber, whereby, tightening said bolt: compresses said ridges inward, toward the shaft, thereby securing said sleeve to the shaft.

5. A coupling device according to claim 1 wherein said shoulder portion is formed of said annular sleeve and extends from said inner surface.

6. A coupling device according to claim 1 wherein a said annular sleeve is formed of two halves and means for joining said two halves.

\* \* \* \* \*